United States Patent
Kawase et al.

(10) Patent No.: US 9,980,357 B1
(45) Date of Patent: May 22, 2018

(54) X-RAY GENERATING DEVICE AND X-RAY PHOTOGRAPHY SYSTEM

(71) Applicant: CANON ANELVA CORPORATION, Kawasaki-shi (JP)

(72) Inventors: Junya Kawase, Kanagawa (JP); Yoichi Ando, Kanagawa (JP)

(73) Assignee: CANON ANELVA CORPORATION, Kawasaki-Shi (JP)

( * ) Notice: Subject to any disclaimer, the term of this patent is extended or adjusted under 35 U.S.C. 154(b) by 0 days. days.

(21) Appl. No.: 15/797,212

(22) Filed: Oct. 30, 2017

Related U.S. Application Data

(63) Continuation of application No. PCT/JP2016/004908, filed on Nov. 17, 2016.

(51) Int. Cl.
  *H05G 1/06* (2006.01)
  *H05G 1/08* (2006.01)
  *H05G 1/32* (2006.01)

(52) U.S. Cl.
  CPC .............. *H05G 1/06* (2013.01); *H05G 1/08* (2013.01); *H05G 1/32* (2013.01)

(58) Field of Classification Search
  CPC .... H05G 1/06; H05G 1/08; H05G 1/32; H01J 35/16; H01J 35/165
  See application file for complete search history.

(56) References Cited

U.S. PATENT DOCUMENTS

| | | | |
|---|---|---|---|
| 4,685,118 A * | 8/1987 | Furbee | H01J 35/06 378/114 |
| 9,111,655 B2 | 8/2015 | Ohashi et al. | |
| 9,741,524 B2 | 8/2017 | Kawase | |
| 2003/0147498 A1 * | 8/2003 | Hadland | H01J 35/045 378/119 |
| 2014/0177805 A1 * | 6/2014 | Wang | H05G 1/10 378/104 |
| 2015/0036801 A1 | 2/2015 | Ohashi et al. | |

FOREIGN PATENT DOCUMENTS

| | | |
|---|---|---|
| JP | 58-151810 A | 9/1983 |
| JP | 2001-324625 A | 11/2001 |
| JP | 2003-317996 A | 11/2003 |
| JP | 2007-141510 A | 6/2007 |
| JP | 2007-149521 A | 6/2007 |
| JP | 2010-248727 A | 11/2010 |
| WO | 2015-121953 A1 | 8/2015 |

* cited by examiner

*Primary Examiner* — Glen Kao
(74) *Attorney, Agent, or Firm* — Fitzpatrick, Cella, Harper & Scinto

(57) ABSTRACT

An X-ray generating device includes an X-ray tube, an X-ray tube drive circuit, an electron acceleration voltage generation circuit, and a control unit communicating with the drive circuit and the voltage generation circuit, the X-ray tube, the drive circuit, and the voltage generation circuit are arranged inside a storage container filled with an insulating oil, a path connecting the drive circuit and the control unit includes an optical fiber cable arranged inside the storage container, the optical fiber cable has a coating that suppresses fluctuation due to a convective flow of the insulating oil, the coating is cured by, from a resin material containing a plasticizer, a part of the plasticizer being leaching out, and the control unit is configured to facilitate leaching of the plasticizer by driving the voltage generation circuit to apply a voltage to the optical fiber cable in a state of no X-ray being generated.

3 Claims, 4 Drawing Sheets

X-RAY GENERATING DEVICE AND X-RAY PHOTOGRAPHY SYSTEM

CROSS-REFERENCE TO RELATED APPLICATIONS

This application is a continuation application of International Application PCT/JP2016/004908 filed on Nov. 17, 2016 and designated the U.S., the entire contents of which are incorporated herein by reference.

TECHNICAL FIELD

The present invention relates to an X-ray generating device and an X-ray photography system.

BACKGROUND ART

An X-ray photography system is known as one of industrial nondestructive inspection devices. For example, an X-ray inspection device having a micro-focus X-ray tube is used for inspection of electronic devices represented by semiconductor integrated circuit substrates. An X-ray tube is an X-ray source that emits an X-ray from a target by applying, between an anode and a cathode, a high voltage with a predetermined potential difference in accordance with an X-ray energy to irradiate the target with electrons accelerated by the high voltage. A micro-focus X-ray tube is an X-ray tube having a plurality of grid electrodes on the cathode side and has a function of converging the orbit of an electron beam by controlling an electrostatic lens with the voltage applied to these grid electrodes.

In an X-ray generating device using a micro-focus X-ray tube, improvement of a grounding scheme of the X-ray tube, a supplying method of a control signal, or the like has been made to address the need for controlling the voltage applied to the grid electrodes. For example, an X-ray generating device disclosed in Japanese Patent Application Publication No. 2003-317996 is configured such that the control signal of the grid voltage applied to grid electrodes is supplied through an optical fiber cable, and thereby a negative high voltage can be applied to the cathode of the X-ray tube. Further, a neutral grounding scheme in which an enclosure of the X-ray tube is grounded and a positive high voltage and a negative high voltage are applied to the anode and the cathode is employed, and thereby the voltage applied between the enclosure and the anode is reduced by around half.

In terms of easy handling or the like when installing an X-ray generating device in an X-ray photography system, there is a demand for a reduction in size of the X-ray generating device. Further, in terms of a higher penetrating power, there is a demand for an increase in the voltage applied to an X-ray tube. However, study by the inventors of the present application has first revealed that an advancement of reduction in size of the X-ray generating device or increase in the application voltage may increase malfunction of a control system.

SUMMARY OF INVENTION

An object of the present invention is to provide an X-ray generating device which can suppress malfunction of the control system due to the advancement of reduction in size or increase in the application voltage. Further, another object of the present invention is to provide a reliable X-ray photography system which can stably acquire captured images by using such the X-ray generating device.

According to an aspect of the present invention, there is provided an X-ray generating device including an X-ray tube, a drive circuit that drives the X-ray tube, a voltage generation circuit that generates an electron acceleration voltage applied to the X-ray tube, and a control unit that communicates with the drive circuit and the voltage generation circuit, wherein at least the X-ray tube, the drive circuit, and the voltage generation circuit are arranged inside a storage container filled with an insulating oil, wherein at least a part of a path connecting the drive circuit and the control unit is formed of an optical fiber cable arranged inside the storage container, wherein the optical fiber cable has a coating that suppresses fluctuation of the optical fiber cable due to a convective flow of the insulating oil generated at driving of the voltage generation circuit, wherein the coating is cured by, from a resin material containing a plasticizer, at least apart of the plasticizer being leaching out, and wherein the control unit is configured to facilitate leaching of the plasticizer by driving the voltage generation circuit to apply a voltage for a predetermined time to the optical fiber cable in a state of no X-ray being generated.

Further, according to another aspect of the present invention, there is provided a method of manufacturing an X-ray generating device including an X-ray tube, a drive circuit that drives the X-ray tube, a voltage generation circuit that generates an electron acceleration voltage applied to the X-ray tube, and a control unit that communicates with the drive circuit and the voltage generation circuit, wherein at least the X-ray tube, the drive circuit, and the voltage generation circuit are arranged inside a storage container filled with an insulating oil, and wherein at least apart of a path connecting the drive circuit and the control unit is formed of an optical fiber cable arranged inside the storage container, the method including installing the X-ray tube, the drive circuit, the voltage generation circuit, and the optical fiber cable inside the storage container, filling the insulating oil in the storage container, and curing, after filling the insulating oil in the storage container, a coating of the optical fiber cable by driving the voltage generation circuit, without driving the drive circuit, to apply a voltage for a predetermined time to the optical fiber cable having the coating of a resin material containing a plasticizer and causing the plasticizer to leach out from the coating.

DESCRIPTION OF EMBODIMENTS

First Embodiment

Figure 1:
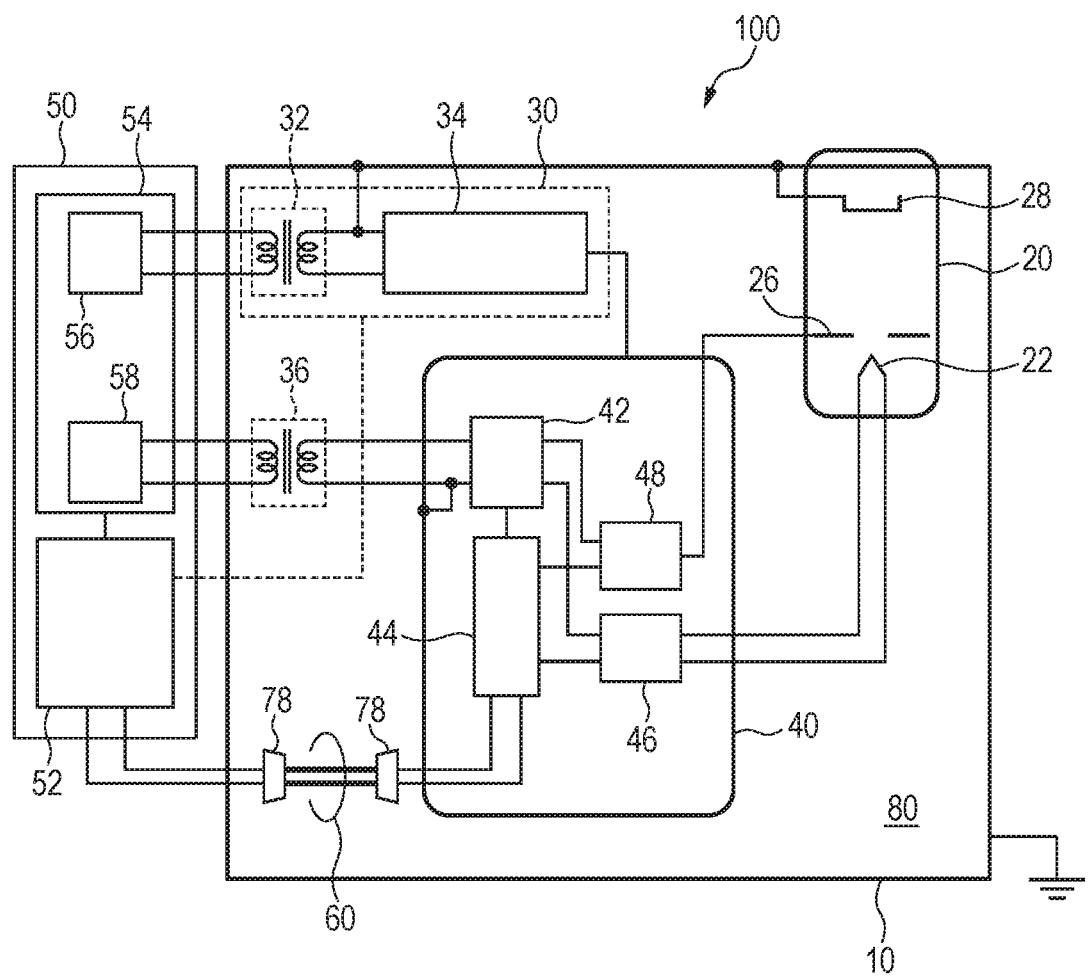
FIG. 1 is a block diagram illustrating a general configuration of an X-ray generating device according to a first embodiment of the present invention.
Figure 2:
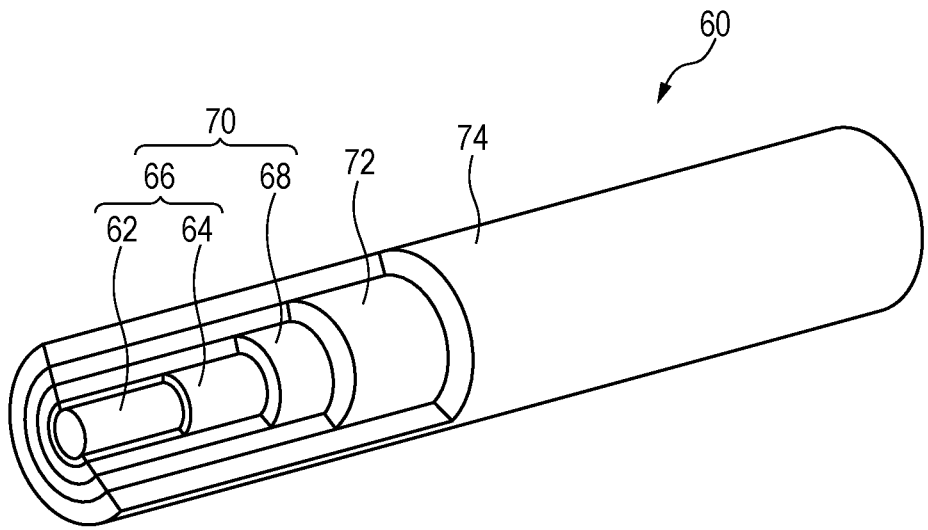
FIG. 2 is a schematic diagram illustrating an example of a configuration of an optical fiber cable.
Figure 3:
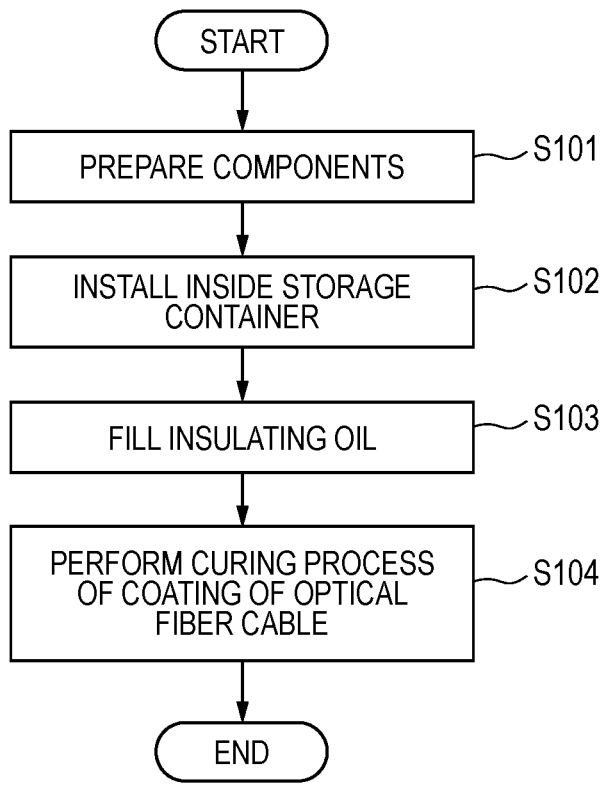
FIG. 3 is a flowchart illustrating a method of manufacturing the X-ray generating device according to the first embodiment of the present invention.

An X-ray generating device according to a first embodiment of the present invention will be described with reference FIG. 1 to FIG. 3. FIG. 1 is a block diagram illustrating the general configuration of the X-ray generating device according to the present embodiment. FIG. 2 is a schematic diagram illustrating an example of the configuration of an optical fiber cable. FIG. 3 is a flowchart illustrating a method of manufacturing the X-ray generating device according to the present embodiment.

First, the configuration of the X-ray generating device according to the present embodiment will be described by using FIG. 1 and FIG. 2.

As illustrated in FIG. 1, an X-ray generating device 100 according to the present embodiment includes an X-ray tube 20, a high voltage generation circuit 30, an electron gun drive circuit 40, and a control unit 50. At least the X-ray tube 20, the high voltage generation circuit 30, and the electron gun drive circuit 40 of the above components are arranged inside a storage container 10. The storage container 10 is filled with an insulating oil 80 in order to ensure a dielectric withstand voltage among respective components arranged in the storage container 10. An electric insulating oil such as a mineral oil, a silicone oil, a fluorine-base oil, or the like is preferable as the insulating oil 80. A mineral oil, which is easily handled, is preferably applied to an X-ray generating device with the X-ray tube 20 whose rated tube voltage is around 100 kV.

The X-ray tube 20 includes an electron source 22, a grid electrode 26, and an anode 28. The electron source 22 and the grid electrode 26 are connected to the electron gun drive circuit 40 and applied with desired control voltages, respectively. The anode 28 is connected to the storage container 10 maintained at a ground potential. A target (not illustrated) that generates an X-ray by irradiation of an electron beam is provided to the anode 28. Note that, although only the single grid electrode 26 is depicted in FIG. 1, a plurality of grid electrodes 26 are typically provided.

While the electron source 22 is not limited in particular, a hot cathode such as a tungsten filament or an impregnated cathode or a cold cathode such as a carbon nanotube, or the like may be applied thereto, for example. The material forming a target is preferably a material having a high melting point and a high X-ray generation efficiency, and a tungsten, a tantalum, a molybdenum, an alloy thereof, or the like may be applied thereto, for example. Note that, the electron source 22 and the grid electrode 26 may be collectively referred to as "electron gun" in the present specification.

An X-ray is emitted from the target by accelerating electrons emitted from the electron source 22 by a high voltage between the electron source 22 and the anode 28 to cause the accelerated electrons to collide with the target provided on the anode 28. The amount of X-ray emitted from the target can be controlled by using the amount of the electron beam irradiated to the target, that is, the supplied current in the case of the hot-cathode type electron source 22. The orbit of the electron beam irradiated to the target can be controlled by using the grid voltage applied to the grid electrode 26. In this sense, the electron source 22 and the grid electrode 26 forma control mechanism that controls the electron beam emitted from the electron gun.

The high voltage generation circuit 30 includes a step-up transformer 32 and a step-up circuit 34. The step-up circuit 34 may be a Cockcroft circuit, for example. The high voltage generation circuit 30 generates a negative high voltage against the storage container 10 maintained at the ground potential. The high voltage generation circuit 30 is connected to the electron gun drive circuit 40.

The electron gun drive circuit 40 includes a rectifier circuit 42, a logic circuit 44, an electron source drive circuit 46, and a grid voltage control circuit 48. The rectifier circuit 42 is connected to the logic circuit 44, the electron source drive circuit 46, and the grid voltage control circuit 48. Thereby, a voltage supplied to the rectifier circuit 42 via a high insulating transformer 36 is rectified, and the rectified voltage can be supplied to the logic circuit 44, the electron source drive circuit 46, and the grid voltage control circuit 48. One of the input terminals of the rectifier circuit 42 is connected to the output terminal of the high voltage generation circuit 30. That is, in each circuit of the electron gun drive circuit 40, the negative potential supplied from the high voltage generation circuit 30 is used as a reference potential of the electron gun drive circuit 40.

The electron source drive circuit 46 controls the voltage or the current supplied to the electron source 22 in accordance with a control signal supplied from a control circuit 52 via the logic circuit 44. The grid voltage control circuit 48 controls a grid voltage supplied to the grid electrode 26 in accordance with a control signal supplied from a control circuit 52 via the logic circuit 44.

The control unit 50 includes the control circuit 52 and an inverter circuit 54. The control circuit 52 is connected to the electron gun drive circuit 40 and the inverter circuit 54. The inverter circuit 54 includes an inverter 56 connected to the step-up transformer 32 arranged inside the storage container 10 and an inverter 58 connected to the high insulating transformer 36 arranged inside the storage container 10. The control circuit 52 supplies predetermined control signals to the electron gun drive circuit 40 and the inverter circuit 54. The inverter circuit 54 controls the inverters 56 and 58 in accordance with the control signal supplied from the control circuit 52 and supplies predetermined drive voltages to the step-up transformer 32 and the high insulating transformer 36. The control circuit 52 monitors an output voltage of the high voltage generation circuit 30 and adjusts the drive voltage of the step-up transformer 32 by using the control signal supplied to the inverter circuit 54 such that the output voltage of the high voltage generation circuit 30 becomes a predetermined voltage.

As illustrated in FIG. 1, the control unit 50 and the high voltage generation circuit 30 are connected via the step-up transformer 32, that is, insulated from each other. Similarly, the control unit 50 and the electron gun drive circuit 40 are connected via the high insulating transformer 36, that is, insulated from each other. In an example, the control unit 50 is connected to the ground potential. Further, the electron gun drive circuit 40 is connected to the high voltage generation circuit 30. Therefore, a potential corresponding to a negative high voltage generated at the high voltage generation circuit 30 via the step-up transformer 32 occurs between the control unit 50 and the electron gun drive circuit 40. That is, an electric field occurs between the control unit 50 and the electron gun drive circuit 40.

Among paths responsible for mutual communication between the control circuit 52 and the electron gun drive circuit 40, at least a part of the paths within the storage container 10 is formed of an optical fiber cable 60 in order to maintain electric insulation. This enables a control signal from the control circuit 52, which operates based on the ground potential as the reference potential, to control the electron source drive circuit 46 and the grid voltage control circuit 48 within the electron gun drive circuit 40, which operates based on the negative potential supplied from the high voltage generation circuit 30 as the reference voltage. The optical fiber cable 60 is connected to the control circuit 52 and the logic circuit 44 via a photoelectric conversion device 78. Note that the reference potential is a potential that is defined as a reference in each circuit.

Here, in the X-ray generating device 100 according to the present embodiment, the coating material of the optical fiber cable 60 is formed of a material that has a sufficient rigidity for suppressing fluctuation of the optical fiber cable 60 due to a convective flow of the insulating oil 80 when the X-ray generating device 100 is driven.

As discussed above, the advancement of reduction in size or increase in an application voltage of the X-ray generating device has revealed an issue of malfunction of a control system in which the control circuit 52 controls the electron source drive circuit 46 or the grid voltage control circuit 48. Study by the inventors has found that one of the reasons of such malfunction is an increased fluctuation of an optical fiber cable caused by an increased convective flow of the insulating oil 80 at driving due to the reduction in size or the increase in the application voltage of the device.

When a high voltage is applied to the X-ray tube 20 from the high voltage generation circuit 30 inside the storage container 10 filled with the insulating oil 80, the insulating oil 80 around the high voltage generation circuit 30 is locally charged and convectively flows due to Electro Hydro Dynamics (EHD) effect. This convective flow increases as the electric field intensity increases, that is, as the reduction in size or the increase in the application voltage of the X-ray generating device is advanced. A faster flow speed of the insulating oil 80 results in larger fluctuation of the soft optical fiber cable 60, which may cause a communication error between the control unit 50 and the electron gun drive circuit 40 in some cases. Since such a convective flow of the insulating oil 80 occurs at random inside the storage container 10, it is difficult to suppress an influence of the convective flow by improving the position of the optical fiber cable 60.

From this point of view, in the X-ray generating device according to the present embodiment, the coating material of the optical fiber cable 60 is formed of a material having a rigidity which can sufficiently suppress the fluctuation of the optical fiber cable 60 due to a convective flow of the insulating oil 80 when the X-ray generating device 100 is driven. If the optical fiber cable 60 is not flexible in the manufacturing of the X-ray generating device 100, however, installation of various components or connection of the optical fiber cable 60 to the inside of the storage container 10 will be difficult, which may be expected to be an obstacle to assembling.

Thus, in the X-ray generating device according to the present embodiment, the coating material of the optical fiber cable 60 is formed of a material which is flexible at assembling but is able to be cured in the subsequent process. Then, the fluctuation of the optical fiber cable 60 due to a convective flow of the insulating oil 80 is suppressed by curing the coating material to enhance the rigidity of the optical fiber cable 60 after assembling. The coating material of the cured optical fiber cable 60 is configured such that the form of the optical fiber cable 60 when the high voltage generation circuit 30 is driven is maintained to substantially the same form as the form of the optical fiber cable 60 when the high voltage generation circuit 30 is not driven. Substantially the same form means that an influence such as an occurrence rate of communication errors, for example, on a signal propagating in the optical fiber cable 60 does not change between the form when the high voltage generation circuit 30 is driven and the form when the high voltage generation circuit 30 is not driven.

In the present embodiment, a resin material containing a plasticizer is used as a coating material of the optical fiber cable 60 having the above characteristics. The resin material containing a plasticizer loses flexibility and is cured by leaching of the plasticizer. By assembling the X-ray generating device in a state where the resin material forming the coating material of the optical fiber cable 60 contains the plasticizer and is still flexible and then removing the plasticizer for curing, it is possible to enhance the rigidity of the optical fiber cable 60 at driving of the X-ray generating device without obstructing the assembling.

Note that leaching of a plasticizer added to a resin material is known and such a plasticizer is made so as not to leach out in general. In contrast, in the present invention, by intentionally allowing a plasticizer added to a resin material to leach out in an insulating oil, the optical fiber cable 60 is cured to suppress fluctuation of the optical fiber cable 60 due to a convective flow of the insulating oil 80.

As illustrated in FIG. 2, for example, the optical fiber cable 60 has an element optical fiber 70 in which an optical fiber 66 comprising a core 62 and a clad 64 is covered with a resin member 68, a primary coating 72 made of tensile strength fibers such as glass fibers, and a secondary coating 74 made of a resin material. In such the optical fiber cable 60, the secondary coating 74 as an outer jacket can be formed of a resin material containing a plasticizer. Alternatively, an outer jacket (the secondary coating 74) of the optical fiber cable 60 may be coated with a resin material containing a plasticizer.

The resin material forming a coating member of the optical fiber cable 60 is not limited in particular, and a polyvinyl chloride resin may be applied thereto, for example. Further, a plasticizer added to a resin material is not limited in particular as long as it may facilitate leaching from the resin material by a process described later. For example, DEHP (dioctyl phthalate), DINP (diisononyl phthalate), or the like of phthalic esters may be applied as a plasticizer added to the polyvinyl chloride resin.

Since a rigidity required to the optical fiber cable 60 depends on a flow rate of the insulating oil 80 that varies in accordance with a voltage applied to the X-ray tube 20, a length of the optical fiber cable 60, or the like, the rigidity cannot be defined in the same way. It is desirable to see the flow rate of the insulating oil 80 at driving in advance and select a coating member of the optical fiber cable as appropriate so that the rigidity which does not cause fluctuation at this time is achieved by the cured optical fiber cable 60. The rigidity of the cured optical fiber cable can be adjusted by a resin material, a thickness of a coating, an amount of a plasticizer added in advance, or the like, for example. Note that, in the present specification, a rigidity which does not cause fluctuation of the optical fiber cable 60 means a rigidity sufficient for preventing a communication error in the communication through the optical fiber cable 60. Fluctuation of the optical fiber cable 60 is not required to be completely prevented as long as no communication error due to fluctuation of the optical fiber cable 60 occurs.

A method of applying a high voltage to the optical fiber cable 60 in the insulating oil 80 may preferably be used as a method of removing a plasticizer from a resin material forming a coating member of the optical fiber cable 60 for curing. Study by the inventors has found that application of a high voltage to a resin material containing a plasticizer in an insulating oil facilitates leaching of the plasticizer from the resin material. That is, application of a voltage for a predetermined time to the optical fiber cable 60 inside a storage container filled with the insulating oil 80 allows the optical fiber cable 60 to be cured.

As described above, in the X-ray generating device according to the present embodiment, at operation, a potential difference occurs between the electron gun drive circuit 40 and the control circuit 52 on the connection path of the optical fiber cable 60. Since a potential difference between the electron gun drive circuit 40 and the control circuit 52 causes a voltage to be applied to the optical fiber cable 60 therebetween, this voltage can facilitate leaching of the plasticizer from the resin material of the optical fiber cable 60. That is, in the X-ray generating device according to the present embodiment, the coating member of the optical fiber cable 60 can be cured by utilizing the function of the X-ray generating device as it stands without using any additional solution.

Next, a method of manufacturing the X-ray generating device according to the present embodiment will be described by using FIG. 3. The X-ray generating device according to the present embodiment can be manufactured according to a flow illustrated in FIG. 3.

First, respective components of the X-ray generating device are prepared (step S101). In this step, an optical fiber cable formed of a resin material whose coating member contains a plasticizer is prepared as the optical fiber cable 60.

Subsequently, among the prepared components, those to be accommodated in the storage container 10 are installed inside the storage container 10 (step S102). In this step, since the optical fiber cable 60 has a coating member formed of the resin material containing the plasticizer and is flexible, installation of respective components and connection of the optical fiber cable 60 can be easily made.

Subsequently, the insulating oil 80 is filled in the storage container 10 (step S103). It is preferable to apply vacuum impregnation, in which the insulating oil 80 is injected into the storage container 10 after evacuating the inside of the storage container 10, to fill the insulating oil 80 in the storage container 10.

Subsequently, after the completion of assembling of the X-ray generating device, the high voltage generation circuit 30 is driven, and a potential difference is generated between the electron gun drive circuit 40 and the control circuit 52. This potential difference causes a voltage to be applied to the optical fiber cable 60, the plasticizer leaches out from the resin material of the coating of the optical fiber cable 60, and the coating of the optical fiber cable 60 is cured (step S104). The curing process of the coating of the optical fiber cable 60 can be performed at the same time as driving for aging of the X-ray generating device or inspection of the function of respective components.

The voltage applied between the electron gun drive circuit 40 and the control circuit 52 in performing the curing process of the optical fiber cable 60 is not necessarily required to be the same as the voltage applied between the electron gun drive circuit 40 and the control circuit 52 in generating an X-ray. The voltage applied between the electron gun drive circuit 40 and the control circuit 52 can be set as appropriate to values suitable for the curing of the optical fiber cable 60 and the generation of the X-ray, respectively.

Further, in the curing process of the optical fiber cable 60, not whole of the plasticizer contained in the coating of the optical fiber cable 60 is required to leach out. The hardness of the coating generally increases as the plasticizer leaches out, and thus leaching of only a part of the plasticizer may allow for a desired rigidity. In this case, the plasticizer may remain in the coating after the curing process. In this case, it may be preferable to perform the curing process of the optical fiber cable 60 while monitoring fluctuation (hardness) of the optical fiber cable 60 and stop the curing process when a desired hardness is exceeded.

Although time required to the curing process of the optical fiber cable 60 may not be defined in the same way because it varies in accordance with a voltage applied to the optical fiber cable 60, compositions of the coating, or the like, the time is typically around several hours. During this curing process, the X-ray generating device may be controlled to stop generating X-ray. For a curing process of the optical fiber cable 60, a drive mode in which the high voltage generation circuit 30 is driven in a state of no X-ray being generated may be implemented as a drive mode of the X-ray generating device performed under the control of the control unit 50.

Note that a state of no X-ray being generated can be controlled by a voltage applied to the grid electrode 26, for example. For example, switching of the voltage applied to the grid electrode 26 allows electrons generated by the electron source 22 to stay between the electron source 22 and the grid electrode 26 or to reach the anode. In this case, a state of no X-ray being generated can be realized by the control that causes electrons to stay between the electron source 22 and the grid electrode 26.

By curing the coating of the optical fiber cable 60 as discussed above, it is possible to suppress fluctuation of the optical fiber cable 60 due to a convective flow of the insulating oil 80 at the operation of the X-ray generating device and prevent malfunction of the control system.

As discussed above, according to the present embodiment, since the rigidity of the optical fiber cable 60 is increased and fluctuation of the optical fiber cable 60 due to a convective flow of the insulating oil 80 is suppressed, malfunction of the control system can be reduced. This allows for a further reduction in size of the X-ray generating device and a further increase in the application voltage.

Second Embodiment

Figure 4:
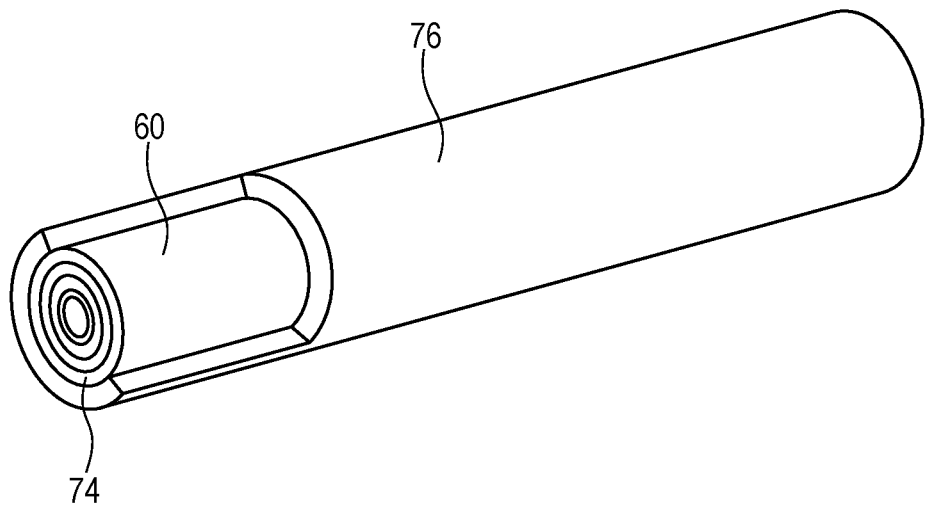
FIG. 4 is a schematic diagram illustrating an example of a configuration of an optical fiber cable of X-ray generating devices according to second and third embodiments of the present invention.
Figure 5:
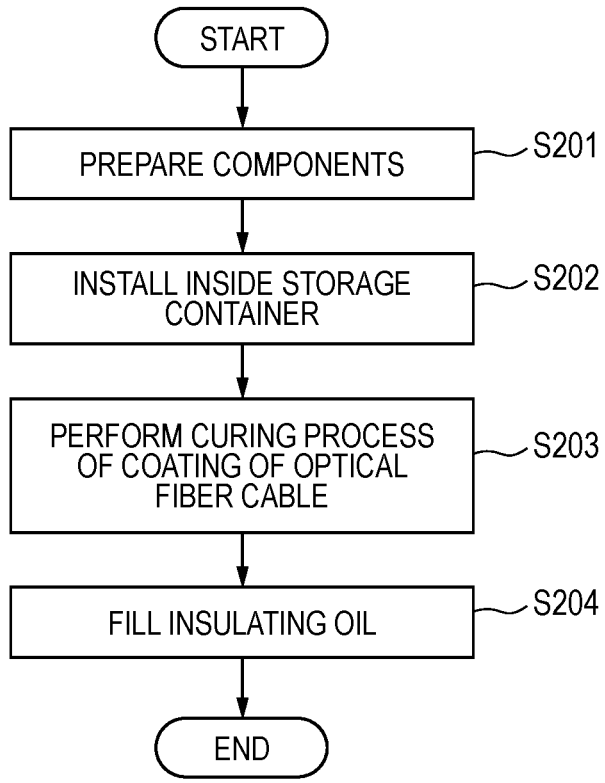
FIG. 5 is a flowchart illustrating a method of manufacturing the X-ray generating devices according to the second and third embodiments of the present invention.

An X-ray generating device according to a second embodiment of the present invention will be described with reference to FIG. 4 and FIG. 5. The same components as those of the first embodiment are labeled with the same reference numerals, and the description thereof will be omitted or simplified. FIG. 4 is a schematic diagram illustrating the structure of an optical fiber cable of the X-ray generating device according to the present embodiment. FIG. 5 is a flowchart illustrating a method of manufacturing the X-ray generating device according to the present embodiment.

The X-ray generating device according to the present embodiment is the same as the X-ray generating device of the first embodiment except the difference of the configuration of the optical fiber cable 60. That is, in the X-ray generating device according to the present embodiment, a coating made of an epoxy resin is provided on the outer circumference of the optical fiber cable 60.

The epoxy resin is a thermoplastic resin that is cured when mixed with a curing agent. While a thermoplastic resin has a flexibility immediately after an epoxy resin and a curing agent are mixed, the thermoplastic resin has a rigidity that can withstand fluctuation of the optical fiber cable 60 due to a convective flow of the insulating oil 80 as it is cured with elapsed time. Further, the cured epoxy resin has an oil resistance and would not be softened in reaction with the insulating oil 80. Therefore, by coating the optical fiber cable 60 with an epoxy resin, it is possible to suppress fluctuation of the optical fiber cable 60 due to a convective flow of the insulating oil 80 at the operation of the X-ray generating device and to prevent malfunction of the control system.

A coating 76 made of an epoxy resin may be provided so as to cover the outer jacket (the secondary coating 74) of the optical fiber cable 60 as illustrated in FIG. 4, for example, or may be provided as an outer jacket (for example, the secondary coating 74) of the optical fiber 66. The epoxy resin coating 76 is not necessarily required to be provided on the entire outer circumference of the optical fiber cable 60 as long as it provides a desired rigidity to the optical fiber cable 60. Further, the epoxy resin coating 76 is not necessarily required to be provided over the entire length of the optical fiber cable 60.

Next, a method of manufacturing the X-ray generating device according to the present embodiment will be described by using FIG. 5. The X-ray generating device according to the present embodiment can be manufactured according to a flow illustrated in FIG. 5.

First, respective components of the X-ray generating device are prepared (step S201).

Subsequently, among the prepared components, those to be accommodated in the storage container 10 are installed inside the storage container 10 (step S202). In this step, the optical fiber cable 60 is installed to a predetermined location in the storage container 10 after an epoxy resin coating mixed with a curing agent is applied thereto and before this epoxy resin is cured. Since the optical fiber cable 60 is flexible before the epoxy resin is cured, installation of respective components and connection of the optical fiber cable 60 can be easily made.

The epoxy resin coating provided on the optical fiber cable is cured as crosslink networking by an epoxy group develops with elapsed time (step S203).

Subsequently, after the epoxy resin is cured, the insulating oil 80 is filled in the storage container 10 (step S103). It is preferable to apply vacuum impregnation, in which the insulating oil 80 is injected into the storage container 10 after evacuating the inside of the storage container 10, to fill the insulating oil 80 in the storage container 10.

By curing the optical fiber cable 60 as discussed above, it is possible to suppress fluctuation of the optical fiber cable 60 due to a convective flow of the insulating oil 80 at the operation of the X-ray generating device and prevent malfunction of the control system.

As discussed above, according to the present embodiment, since the rigidity of the optical fiber cable 60 is increased and fluctuation of the optical fiber cable 60 due to a convective flow of the insulating oil 80 is suppressed, malfunction of the control system can be reduced. This allows for a further reduction in size of the X-ray generating device and a further increase in the application voltage.

Third Embodiment

An X-ray generating device according to a third embodiment of the present invention will be described with reference to FIG. 5. The same components as those of the first and second embodiments are labeled with the same reference numerals, and the description thereof will be omitted or simplified. FIG. 5 is a flowchart illustrating a method of manufacturing the X-ray generating device according to the present embodiment.

The X-ray generating device according to the present embodiment is the same as the X-ray generating device of the first and second embodiments except the difference of the configuration of the optical fiber cable 60. That is, in the X-ray generating device according to the present embodiment, a coating made of a photo-curing resin is provided on the outer circumference of the optical fiber cable 60.

The photo-curing resin is a resin material that is cured by irradiation of an energy ray such as an ultraviolet ray or the like. While a photo-curing resin has a flexibility before irradiation of an energy ray, a cured photo-curing resin has a sufficient rigidity to suppress fluctuation of the optical fiber cable 60 due to a convective flow of the insulating oil 80. Therefore, by coating the optical fiber cable 60 with a photo-curing resin, it is possible to suppress fluctuation of the optical fiber cable 60 due to a convective flow of the insulating oil 80 at the operation of the X-ray generating device and to prevent malfunction of the control system.

A coating 76 made of a photo-curing resin may be provided so as to cover the outer jacket (the secondary coating 74) of the optical fiber cable 60 as illustrated in FIG. 4, for example, or may be provided as an outer jacket (for example, the secondary coating 74) of the optical fiber 66. The photo-curing resin coating is not necessarily required to be provided on the entire outer circumference of the optical fiber cable 60 as long as it provides a desired rigidity to the optical fiber cable 60. Further, the photo-curing resin coating is not necessarily required to be provided over the entire length of the optical fiber cable 60.

Next, a method of manufacturing the X-ray generating device according to the present embodiment will be described by using FIG. 5. The X-ray generating device according to the present embodiment can be manufactured according to the flow illustrated in FIG. 5.

First, respective components of the X-ray generating device are prepared (step S201).

Subsequently, among the prepared components, those to be accommodated in the storage container 10 are installed inside the storage container 10 (step S202). In this step, the optical fiber cable 60 is installed to a predetermined location in the storage container 10 after a photo-curing resin coating is applied thereto and before this photo-curing resin is cured. Since the optical fiber cable 60 is flexible before the photo-curing resin is cured, installation of respective components and connection of the optical fiber cable 60 can be easily made.

Subsequently, the optical fiber cable installed inside the storage container 10 is irradiated with a predetermined energy ray, for example an ultraviolet ray to cure the photo-curing resin of the coating (step S203).

Subsequently, the insulating oil 80 is filled in the storage container 10 after the photo-curing resin is cured (step S204). It is preferable to apply vacuum impregnation, in which the insulating oil 80 is injected into the storage container 10 after evacuating the inside of the storage container 10, to fill the insulating oil 80 in the storage container 10.

By curing the optical fiber cable 60 as discussed above, it is possible to suppress fluctuation of the optical fiber cable 60 due to a convective flow of the insulating oil 80 at the operation of the X-ray generating device and prevent malfunction of the control system.

As discussed above, according to the present embodiment, since the rigidity of the optical fiber cable 60 is increased and fluctuation of the optical fiber cable 60 due to a convective flow of the insulating oil 80 is suppressed, malfunction of the control system can be reduced. This allows for a further reduction in size of the X-ray generating device and a further increase in the application voltage.

Fourth Embodiment

Figure 6:
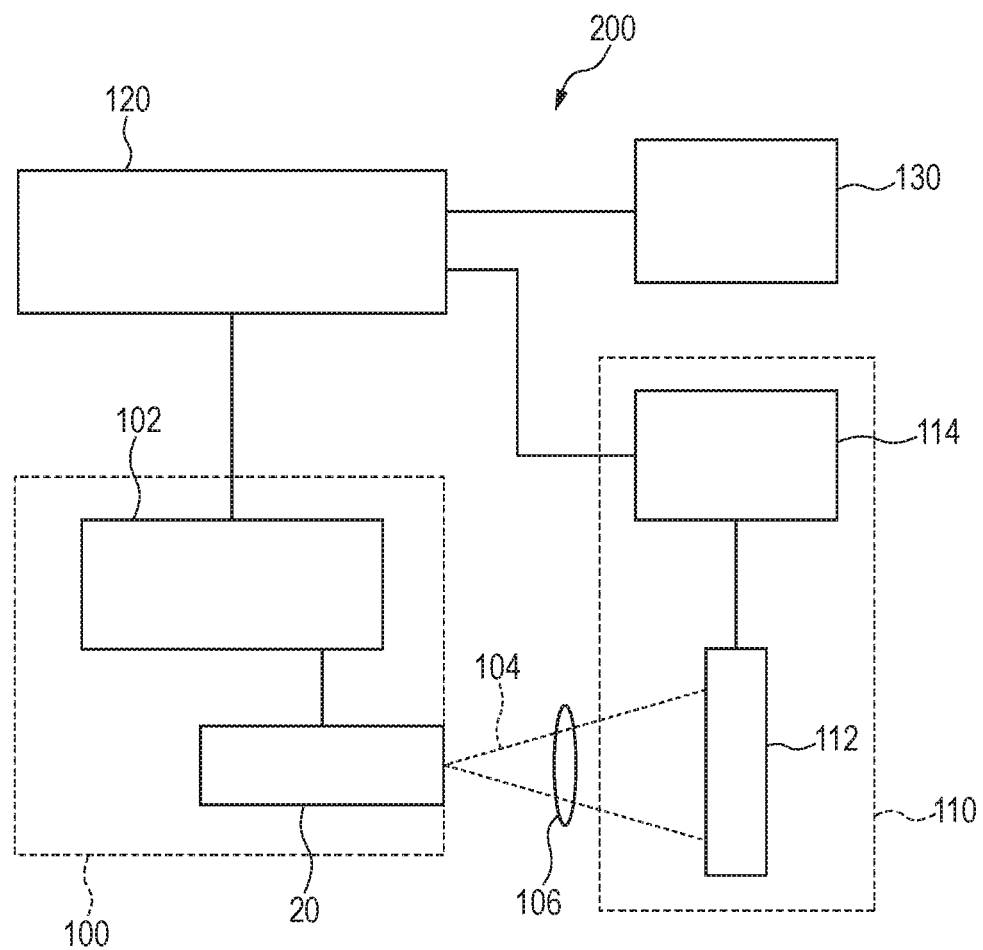
FIG. 6 is a block diagram illustrating a general configuration of an X-ray photography system according to a fourth embodiment of the present invention.

An X-ray photography system according to the fourth embodiment of the present invention will be described with reference to FIG. 6. FIG. 6 is a block diagram illustrating a general configuration of the X-ray photography system according to the present embodiment.

In the present embodiment, the X-ray photography system using the X-ray generating device according to the first to third embodiments is described.

As illustrated in FIG. 6, an X-ray photography system 200 according to the present embodiment includes the X-ray generating device 100, an X-ray detection device 110, a system control device 120, and a display device 130.

The X-ray generating device 100 is the X-ray generating device of any of the first to third embodiments and includes the X-ray tube 20 and an X-ray tube drive circuit 102. The X-ray tube drive circuit 102 includes the high voltage generation circuit 30, the electron gun drive circuit 40, the control unit 50, and the like in the X-ray generating device of the first to third embodiments. The X-ray detection device 110 includes an X-ray detector 112 and a signal processing unit 114. The system control device 120 is responsible for the entire control of the system including the X-ray generating device 100 and the X-ray detection device 110. The display device 130 displays image signals processed by the system control device 120 on a screen.

The X-ray tube drive circuit 102 of the X-ray generating device 100 outputs various control signals to the X-ray tube 20 under the control by the system control device 120. The emission state of an X-ray emitted from the X-ray generating device 100 is controlled by a control signal output from the system control device 120.

An X-ray 104 emitted from the X-ray generating device 100 transmits through a subject 106 and is detected at the X-ray detector 112. The X-ray detector 112 has a plurality of detection elements (not illustrated) and acquires a transmission X-ray image. The X-ray detector 112 converts the acquired transmission X-ray image into an image signal and outputs the image signal to the signal processing unit 114. Between the X-ray tube 20 and the subject 106, a slit, a collimator, or the like (not illustrated) may be arranged in order to suppress unnecessary X-ray irradiation.

The signal processing unit 114 performs predetermined signal processing on an image signal under the control by the system control device 120 and outputs the processed image signal to the system control device 120. The system control device 120 outputs a display signal to the display device 130 in order to cause the display device 130 to display an image based on the processed image signal. The display device 130 displays a captured image of the subject 106 based on the display signal on the screen.

As discussed above, according to the present embodiment, the use of the X-ray generating device 100 of the first to third embodiments which is compact and superior in discharge breakdown voltage characteristics can realize a reliable X-ray photography system 200 that can stably acquire captured images.

Modified Embodiments

The present invention can be modified in various ways without being limited to the embodiments described above.

For example, while the grounding scheme of the X-ray tube 20 is an anode grounding scheme in the first embodiment described above, the grounding scheme of the X-ray tube 20 is not limited to the anode grounding scheme. For example, a neutral point grounding scheme may be employed in which a positive high voltage and a negative high voltage are applied to the anode and the cathode of the X-ray tube, respectively. Further, when the optical fiber cable 60 is cured without using a potential difference between the electron gun drive circuit 40 and the control circuit 52 as seen in the second and third embodiments, for example, it is not necessarily required to cause a potential difference to occur between the electron gun drive circuit 40 and the control circuit 52.

Note that any of the embodiments described above is intended to merely illustrate an embodied example in implementation of the present invention, and the technical scope of the present invention is not to be construed in a limiting sense by these embodiments. That is, the present invention may be implemented in various forms without departing from the technical concept thereof or primary features thereof.

What is claimed is:

1. An X-ray generating device comprising:
   an X-ray tube;
   a drive circuit that drives the X-ray tube;
   a voltage generation circuit that generates an electron acceleration voltage applied to the X-ray tube; and
   a control unit that communicates with the drive circuit and the voltage generation circuit,
   wherein at least the X-ray tube, the drive circuit, and the voltage generation circuit are arranged inside a storage container filled with an insulating oil,
   wherein at least a part of a path connecting the drive circuit and the control unit is formed of an optical fiber cable arranged inside the storage container,
   wherein the optical fiber cable has a coating that suppresses fluctuation of the optical fiber cable due to a convective flow of the insulating oil generated at driving of the voltage generation circuit,
   wherein the coating is cured by, from a resin material containing a plasticizer, at least a part of the plasticizer being leaching out, and
   wherein the control unit is configured to facilitate leaching of the plasticizer by driving the voltage generation circuit to apply a voltage for a predetermined time to the optical fiber cable in a state of no X-ray being generated.

2. A method of manufacturing an X-ray generating device including an X-ray tube, a drive circuit that drives the X-ray tube, a voltage generation circuit that generates an electron acceleration voltage applied to the X-ray tube, and a control unit that communicates with the drive circuit and the voltage generation circuit, wherein at least the X-ray tube, the drive circuit, and the voltage generation circuit are arranged inside a storage container filled with an insulating oil, and wherein at least a part of a path connecting the drive circuit and the control unit is formed of an optical fiber cable arranged inside the storage container, the method comprising:
   installing the X-ray tube, the drive circuit, the voltage generation circuit, and the optical fiber cable inside the storage container;
   filling the insulating oil in the storage container, and
   curing, after filling the insulating oil in the storage container, a coating of the optical fiber cable by driving the voltage generation circuit, without driving the drive circuit, to apply a voltage for a predetermined time to the optical fiber cable having the coating of a resin material containing a plasticizer and causing the plasticizer to leach out from the coating.

3. An X-ray photography system comprising:

the X-ray generating device according to claim 1;

an X-ray detection device that detects an X-ray that has been emitted from the X-ray generating device and has transmitted through a subject; and a signal processing unit that converts a transmission X-ray image of the subject detected by the X-ray detection device into an image signal.

* * * * *